United States Patent [19]
Han et al.

[11] Patent Number: 6,144,409
[45] Date of Patent: Nov. 7, 2000

[54] METHOD FOR PRODUCING A RESTORED BINARY SHAPE SIGNAL BASED ON AN INTERPOLATION TECHNIQUE

[75] Inventors: Seok-Won Han; Jin-Hun Kim, both of Seoul, Rep. of Korea

[73] Assignee: Daewoo Electronics Co., Ltd., Rep. of Korea

[21] Appl. No.: 08/919,960

[22] Filed: Aug. 29, 1997

[30] Foreign Application Priority Data

Jul. 9, 1997 [KR] Rep. of Korea ................. 97-31655

[51] Int. Cl.[7] ................................................ H04N 7/12
[52] U.S. Cl. .................... 348/426; 348/699; 382/243
[58] Field of Search .................................. 348/384, 390, 348/424, 425, 426, 699, 19, 416, 403; 382/232, 241, 242, 243; 358/433; 235/494

[56] References Cited

U.S. PATENT DOCUMENTS

| | | | |
|---|---|---|---|
| 5,288,986 | 2/1994 | Pine et al. ............................. | 235/494 |
| 5,414,527 | 5/1995 | Koshi et al. ............................ | 358/433 |
| 5,481,319 | 1/1996 | Kershaw et al. ....................... | 348/699 |
| 5,519,436 | 5/1996 | Munson ................................. | 348/19 |
| 5,635,986 | 6/1997 | Kim ....................................... | 348/416 |
| 5,691,769 | 11/1997 | Kim ....................................... | 348/403 |
| 5,822,460 | 10/1998 | Kim ....................................... | 382/243 |
| 5,883,678 | 3/1999 | Yamaguchi et al. ................... | 348/390 |

*Primary Examiner*—Howard Britton
*Assistant Examiner*—Tung Vo
*Attorney, Agent, or Firm*—Anderson Kill & Olick

[57] ABSTRACT

A method restores a binary shape signal which has been downsized through the use of a sub-sampling or a down-sampling technique. The downsized binary shape signal contains a plurality of reference lines, wherein each reference line includes one or more segments having successive object pixels therein, and the binary shape signal is restored based on the downsized binary shape signal. Once interpolation lines corresponding to the reference lines are produced based on the number of segments on each of the reference lines, positions of the segments, and the number of object pixels on each of the segments, and then the restored binary shape signal is provided by alternately combining each of the interpolation lines and each of the reference lines.

20 Claims, 10 Drawing Sheets

FIG. 1

| MB1 | MB2 | MB3 |
|---|---|---|
| MB4 | MB0 | MB5 |
| MB6 | MB7 | MB8 |

METHOD FOR PRODUCING A RESTORED BINARY SHAPE SIGNAL BASED ON AN INTERPOLATION TECHNIQUE

FIELD OF THE INVENTION

The present invention relates to a binary shape encoding and decoding method; and, more particularly, to a method for restoring a binary shape signal which is compressed by using a sub-sampling or a down-sampling technique.

DESCRIPTION OF THE PRIOR ART

In digital video systems such as video-telephone and teleconference systems, a large amount of digital data is needed to define each video frame signal since the video frame signal comprises a sequence of digital data referred to as pixel values. Since, however, the available frequency bandwidth of a conventional transmission channel is limited, in order to transmit the substantial amount of digital data therethrough, it is necessary to compress or reduce the volume of data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique wherein an input video image is divided into objects; and three sets of parameters for defining the motion, contour and pixel data of each object are processed through different encoding channels.

One example of such object-oriented coding scheme is the so-called MPEG(Moving Picture Experts Group) phase 4(MPEG-4), which is designed to provide an audio-visual coding standard for allowing content-based interactivity, improved coding efficiency and/or universal accessibility in such applications as low-bit rate communication, interactive multimedia(e.g., games, interactive TV, etc.) and area surveillance(see, for instance, MPEG-4 Video Verification Model Version 2.0, International Organisation for Standardisation, ISO/IEC JTC1/SC29/WG11 N1260, March 1996).

According to MPEG-4, an input video image is divided into a plurality of video object planes(VOP's), which correspond to entities in a bitstream that a user can access and manipulate. A VOP can be referred to as an object and represented by a bounding rectangle whose width and height may be the smallest multiples of 16 pixels(a macroblock size) surrounding each object so that the encoder may process the input video image on a VOP-by-VOP basis, i.e., an object-by-object basis.

A VOP described in MPEG-4 includes shape information and color information consisting of luminance and chrominance data, wherein the shape information is represented by, e.g., a binary mask and related to the luminance data. In the binary mask, one binary value, e.g., 0, is used to designate a pixel located outside the object in the VOP and the other binary value, e.g., 1, is used to indicate a pixel inside the object. Therefore, the shape of an object in a VOP may be made easily noticeable by employing a binary mask.

In order to realize the low bit-rate video signal encoder, a binary shape signal, e.g., a binary mask representing a VOP, that contains one or more subblocks, as exemplarily described in FIG. 1, is downsized through, e.g., a known sub-sampling or a down-sampling technique.

In the sub-sampling or the down-sampling process having a conversion ratio(CR), each of the subblock of M×M pixels is down-sampled to (M×CR)×(M×CR) pixels, and then up-sampled back to M×M pixels, M being a positive integer equal to or greater than 1/CR.

For example, if CR is ½, each of the subblocks consisting of 16×16 pixels as described in FIG. 2A is downsized to a sample block of 8×8 pixels as shown in FIG. 2B. Then, each binary pixel of the sample block is encoded by using a known encoding method, e.g., a context-based arithmetic encoding(CAE) algorithm(see, for example, MPEG-4 Video Verification Model Version 7.0, International Organisation for Standardisation, ISO/IEC JTC1/SC29/WG11 N1642, pp. 28–33, April 1997), and is transmitted through a conventional transmission channel. Meanwhile, since the sample block inevitably includes an error through the above sampling process, the encoder produces a reconstruction block of 16×16 pixels which is an up-sampled block of the downsized sample block so as to find a difference between the reconstruction block and the original subblock thereof. The difference representing the error due to the sampling process is also encoded and transmitted through the conventional transmission channel to thereby reproduce the original subblock at a decoder of a receiving end. The decoder also generates the reconstruction block by up-sampling the received sample block in the same manner as used at the encoder and combines the reconstruction block and the received error to thereby reproduce the original subblock.

As can be seen above, the error rate of the decoder depends on how close the reconstruction block is to the original subblock. Therefore, it is very important to find a method capable of effectively up-sampling the sample block in order to reduce the error rate and to enhance the effectiveness of the sampling process as well.

SUMMARY OF THE INVENTION

It is, therefore, a primary object of the invention to provide an interpolation method for effectively up-sampling a downsized binary shape signal.

In accordance with the present invention, there is provided a method for restoring a binary shape signal, downsized through the use of a sub-sampling or a down-sampling technique, comprising the steps of: (a) receiving the downsized binary shape signal containing a plurality of reference lines, wherein each reference line includes one or more segments and non-segments, a segment being represented by one or more successive object pixels and a non-segment being defined by one or more successive background pixels; (b) producing interpolation lines based on the number of segments on each of the reference lines, positions of the segments, and the number of object pixels included in each of the segments; and (c) providing the restored binary shape signal by combining the interpolation lines and the reference lines.

BRIEF DESCRIPTION OF THE DRAWINGS

The above and other objects and features of the present invention will become apparent from the following description of preferred embodiments given in conjunction with the accompanying drawings, in which:

FIG. 1 illustrates a part of a binary shape signal containing a plurality of subblocks;

DETAILED DESCRIPTION OF THE PREFERRED EMBODIMENTS

Figure 1:
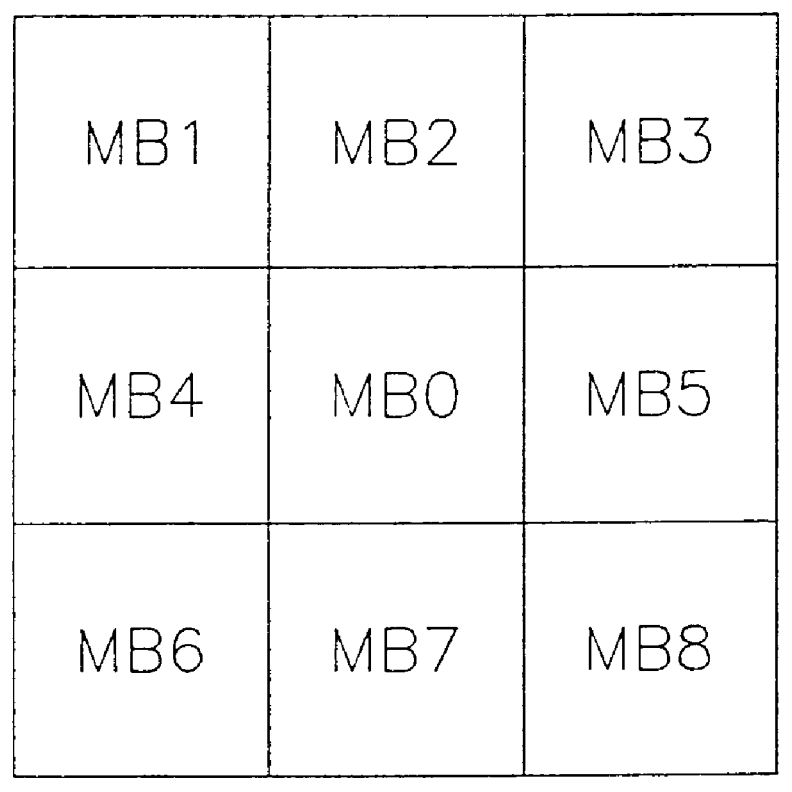

A binary shape signal containing a plurality of subblocks as shown in FIG. 1 is downsized on a block-by-block basis through the application of a sub-sampling or a down-sampling technique. Therefore, the sampled binary shape signal will be up-sampled on the block-by-block basis.

In accordance with an inventive interpolation method, a sample block constituting the sampled binary shape signal is up-sampled to an interpolation block having the same size as the subblock through vertical and/or horizontal interpolation processes. The vertical and the horizontal interpolation processes are sequentially applied one after the other or independently applied from each other depending on the characteristics of the sampling technique.

Figure 2A:
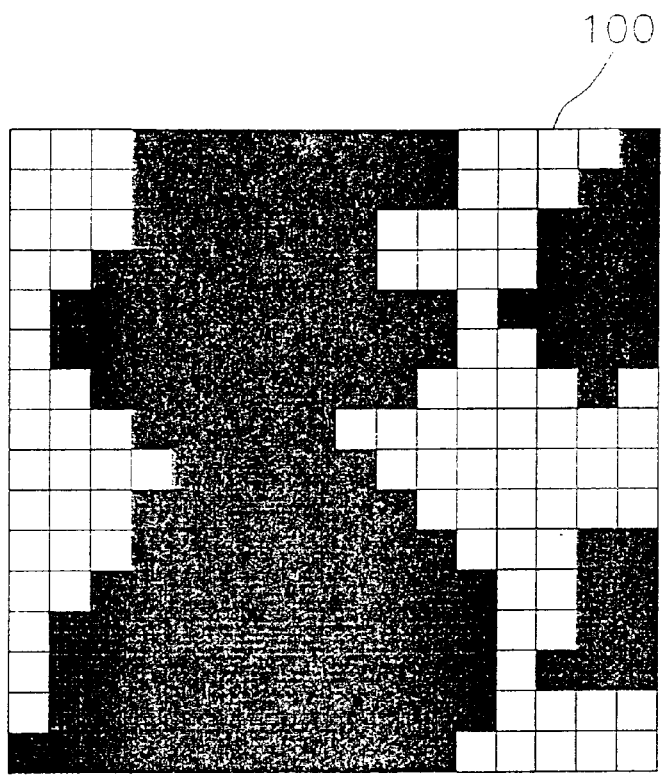
FIGS. 2A and 2B show a subblock and a corresponding sample block produced by a sub-sampling or a down-sampling technique.
Figure 2B:
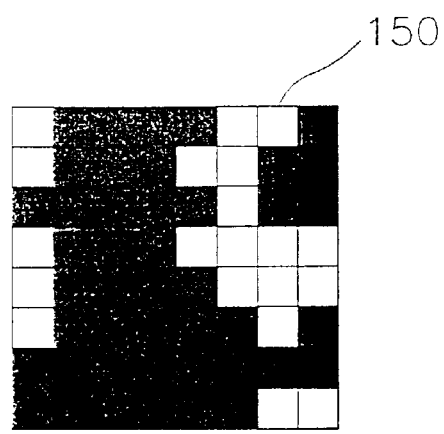

Referring to FIGS. 2A and 2B, there are shown a subblock and a corresponding sample block produced by the sampling process. The subblock 100 of 16×16 pixels is downsized to a sample block 150 of 8×8 pixels by the use of the sampling process having CR of ½. Therefore, in order to extend the sample block 150 to an interpolation block of 16×16 pixels in accordance with the present invention, the vertical and horizontal interpolation processes should be sequentially performed as exemplarily described in FIGS. 4A to 4F or FIGS. 5A to 5F. In the drawings, although the vertical interpolation process precedes the horizontal interpolation process, the order of the interpolation processes may be reversed. That is, the horizontal interpolation can be carried out prior to the vertical interpolation. In the drawings, a black part represents object pixels constituting an object and a white part indicates a background.

In the above interpolation process, in order to produce the interpolation block, the sample block is first vertically or horizontally divided into a plurality of reference lines. Then, segments and non-segments on each of the reference lines are detected, wherein each segment is represented by one or more successive object pixels and each non-segment is defined by one or more successive background pixels. Based on the segments on the reference lines, interpolation lines are generated to constitute the interpolation block together with the reference lines.

Referring to FIGS. 3A to 3D, there are illustrated predetermined rules for producing corresponding interpolation lines based on the reference lines of the sample block. In accordance with the present invention, one interpolation line is produced based on two neighboring reference lines.

Figure 3A:
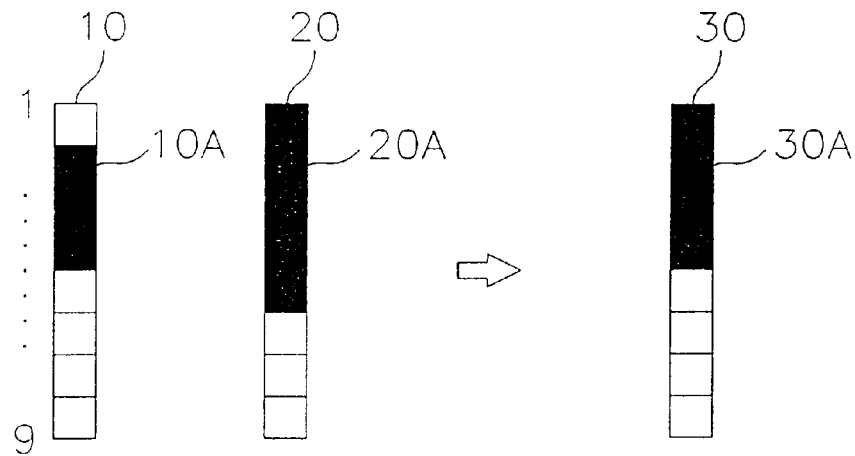
FIGS. 3A to 3D present illustrative diagrams for explaining the present interpolation method.
Figure 3B:
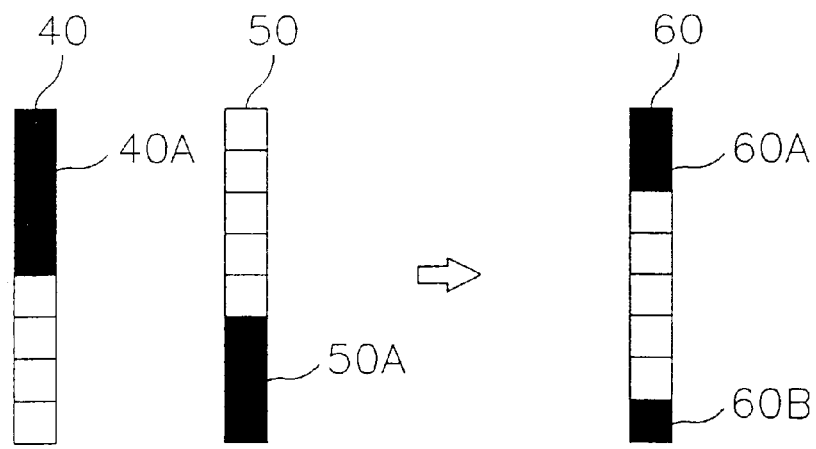
Figure 3C:
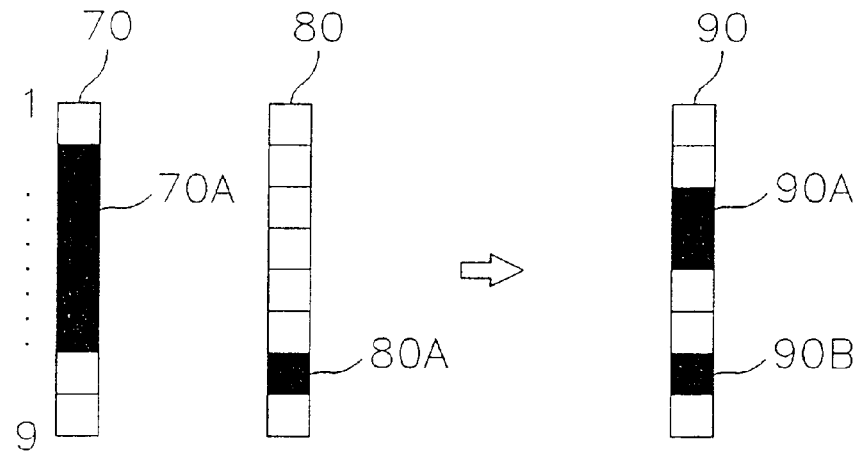

In FIGS. 3A to 3C, there are described three cases in which the number of segments on each of two reference lines is identical.

As shown in FIG. 3A, if there are overlapping segments 10A and 20A on two neighboring reference lines 10 and 20, a segment 30A on an interpolation line 30 resulted from the reference lines 10 and 20 is determined based on positions of starting and ending points of the overlapping segments 10A and 20A. Therefore, the starting point of the segment 30A is calculated by averaging the respective starting points 2 and 1 of the segments 10A and 20A and truncating the average value 1.5 to 1. Likewise, the ending point of the segment 30A is determined as 5 obtained by truncating the average value of the ending points 5 and 6 of the segments 10A and 20A. In the above, the overlapping segments 10A and 20A represent segments overlapped when the reference lines 10 and 20 are overlapped with each other. The overlap of the reference lines 10 and 20 is accomplished by comparing object pixel positions contained in segments on the reference lines 10 and 20.

Meanwhile, if there are non-overlapping segments 40A and 50A on the reference lines 40 and 50 and each of the non-overlapping segments 40A and 50A has a pixel located on a first or a last pixel position of the corresponding reference line as shown in FIG. 3B, wherein the non-overlapping segments 40A and 50A represent segments which do not overlap when the reference lines 40 and 50 are overlapped with each other, segments 60A and 60B on an interpolation line 60 are generated based on the number of pixels within the non-overlapping segments 40A and 50A, respectively. That is, the segment 60A has 2 object pixels which is a half of the number of object pixels on the non-overlapping segment 40A and starts from the first pixel position of the interpolation line 60. While the segment 60B contains one object pixel located on the last pixel position of the interpolation line 60 which is determined by dividing the number of object pixels on the non-overlapping segment 50A by 2 and truncating the division result.

Third, if there exist non-overlapping segments 70A and 80A on the reference lines 70 and 80 and they are positioned next to each other as shown in FIG. 3C, segments 90A and 90B on an interpolation line 90 are determined based on starting and ending points of the non-overlapping segments 70A and 80A, respectively. Starting and ending points of each of the segments 90A and 90B are calculated as follows:

$$SP \approx (3 \times P + 1 \times Q)/4 \qquad \text{Eq. 1}$$

$$EP \approx (1 \times P + 3 \times Q)/4$$

wherein SP and EP represent a starting and an ending points of a segment on the interpolation line, respectively; P and Q are a starting and an ending points of a segment on a reference line corresponding to the interpolation line, respectively; and, if a calculated value of the right part is not an integer, the SP or EP is obtained by truncating the calculated value.

Figure 3D:
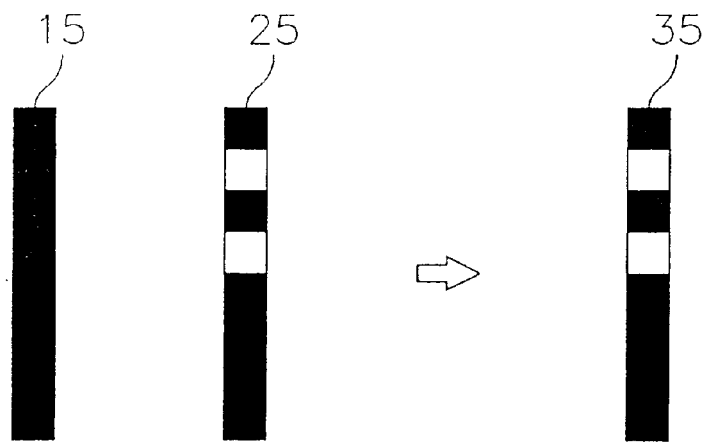

On the other hand, in FIG. 3D, there is shown a case in which the number of segments on each of two reference lines is different. That is, a first reference line 15 consists of one segment and a second reference line 25 has 3 number of segments. In this case, an interpolation line 35 is constructed by AND-operating on both of the reference lines 15 and 25. Therefore, the interpolation line 35 contains object pixels which are commonly included in segments of the reference lines 15 and 25. In FIG. 3D, the interpolation line 35 has the same pixel pattern as the reference line 25 since all of the pixels on the reference line 15 are object pixels.

The predetermined rules explained with reference to FIGS. 3A to 3D can be applied to both of the vertical and the horizontal interpolation processes. Hereinafter, it will be described how the predetermined rules are practically adopted to the vertical and the horizontal interpolation processes. And, a procedure of up-sampling the sample block will be introduced in detail.

In accordance with a first embodiment of the present invention, the interpolation block corresponding to the sample block 150 is generated based on only the sample block 150. On the other hand, in accordance with a second embodiment of the present invention, the interpolation block is provided based on the relationship between the sample block 150 and its neighboring blocks.

Figure 4A:
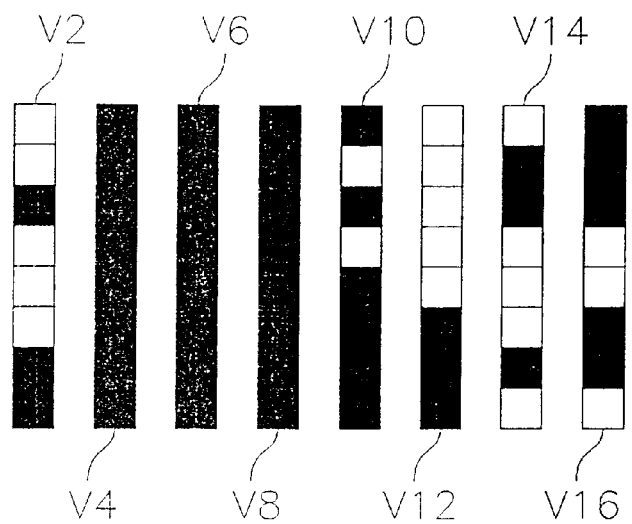
FIGS. 4A to 4F describe an interpolation process in accordance with a first embodiment of the present invention.
Figure 4B:
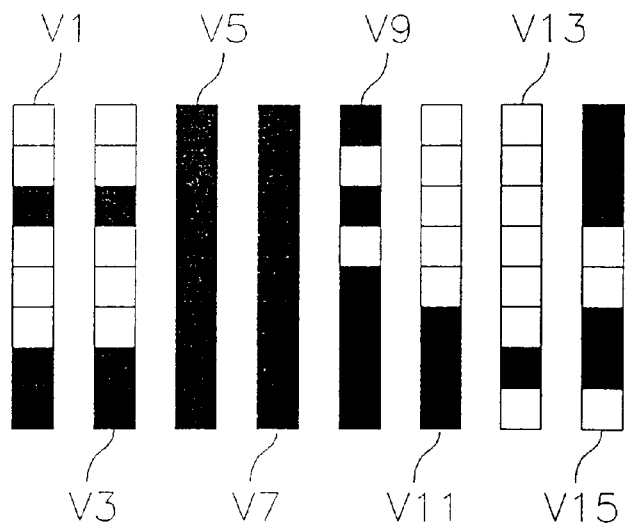

First of all, referring to FIGS. 4A to 4F, there is illustrated an interpolation process in accordance with the first embodiment. The sample block 150 in FIG. 2B is first separated into 8 number of vertical reference lines having assigned indices V2, V4, . . . , V16 for each line as shown in FIG. 4A, each vertical reference line containing vertically connected 8 number of pixels. Once the vertical reference lines V2 to V16 are determined, the number of segments on each of the vertical reference lines V2 to V16 is detected as 2, 1, 1, 1, 3, 1, 2, 2, starting from the most left vertical reference line V2. As comparing the number of segments for each of the vertical reference lines with that for its neighboring vertical reference line, vertical interpolation lines, e.g., V1, V3, . . . , V15 in FIG. 4B, which are to be inserted between the vertical reference lines V2 to V16, are produced according to the predetermined rules depicted in FIGS. 3A to 3D. As can be seen from the indices, each of the vertical reference lines has an (i+1)st position index and each of the vertical interpolation line is represented by an ith position index, i being an odd number, i.e., 1, 3, . . . , and 15. Therefore, for instance, each of the vertical interpolation lines V3 to V15 is determined by its two neighboring vertical reference lines, e.g., V2 and V4, V4 and V6, . . . , and V14 and V16. However, since there is only one vertical reference line V2 corresponding to the vertical interpolation line V1, the vertical interpolation line V1 is determined by copying the vertical reference line V2.

The above indices assigned to the vertical interpolation and reference lines can be differently assigned thereto. That is, the vertical reference lines may be assigned by indices V1 to V15 and the vertical interpolation lines may be defined by indices V2 to V16.

Figure 4C:
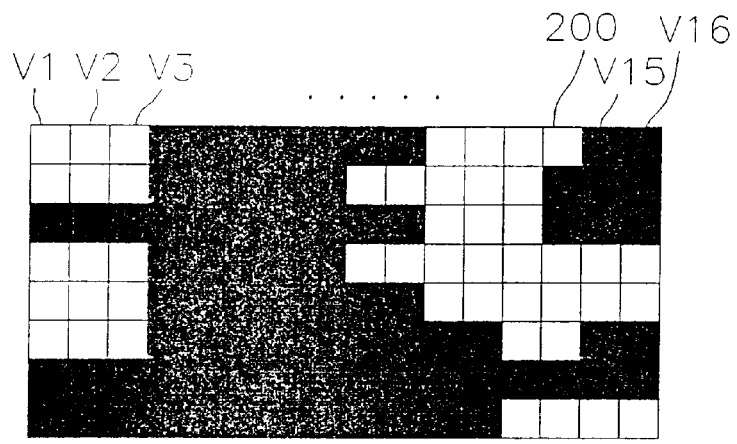
Figure 4D:
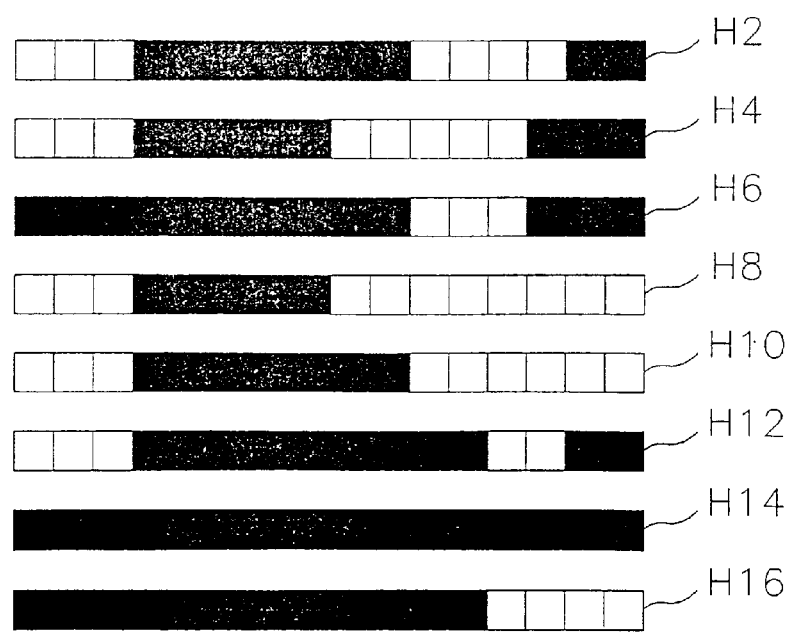
Figure 4E:
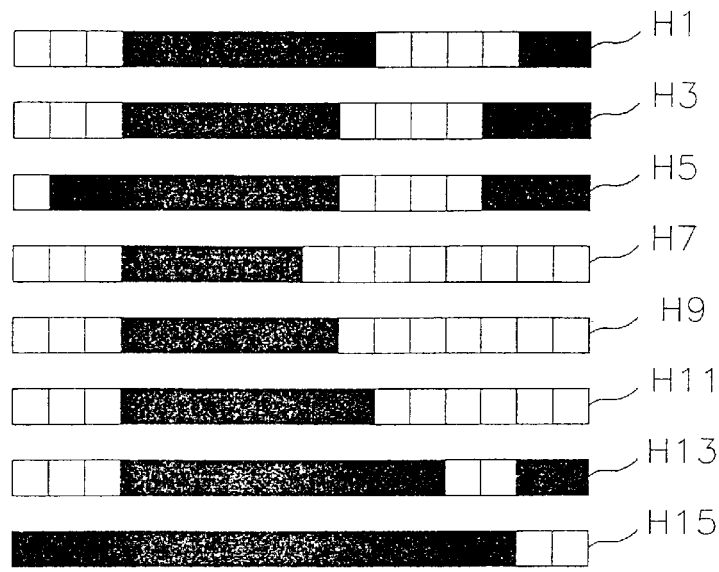

Once the vertical interpolation lines are determined based on the vertical reference lines, in accordance with this embodiment of the present invention, the vertical reference lines and the vertical interpolation lines are combined together by rearranging them in the order of increasing i of the index Vi assigned to the vertical reference and interpolation lines, to thereby produce a vertical interpolation block 200 as shown in FIG. 4C. The vertical interpolation block 200 of 16×8 pixels produced by the above vertical interpolation process is then horizontally divided into 8 number of horizontal reference lines of 16×1 pixels which are assigned by indices H2, H4, . . . , H16 as depicted in FIG. 4D. Based on the horizontal reference lines H2 to H16, horizontal interpolation lines which are to be inserted between the horizontal reference lines are determined as shown in FIG. 4E in the same manner used in the vertical interpolation process. The newly obtained horizontal interpolation lines H1, H3, . . . , H15 are then combined together with the horizontal reference lines H2 to H14 by rearranging them in the order of increasing i of the index Hi thereof to thereby produce an interpolation block 300 of 16×16 pixels in FIG. 4F. In this horizontal interpolation process, the first horizontal interpolation line H1 is produced by copying the first horizontal reference line H2 as in the vertical interpolation process. In applying the predetermined rules to the horizontal interpolation process, a pixel on the left hand side of each horizontal reference line has preference over a pixel on the right hand side thereof.

By performing the vertical and horizontal interpolation processes illustrated with reference to FIGS. 4A to 4F on the sample block 150, the interpolation block 300 in FIG. 4F has been obtained.

Referring to FIGS. 5A to 5F, there is illustrated an interpolation process in accordance with the second embodiment of the present invention. That is, an interpolation block corresponding to the sample block 150 is determined based on the sample block 150 and its neighboring sample blocks. For example, this embodiment produces the interpolation block of the sample block 150 by using results of interpolation processes of a left and an upper neighboring sample blocks of the sample block 150, wherein it is assumed that the left and the upper neighboring sample blocks have already been interpolated prior to the sample block 150.

Figure 5A:
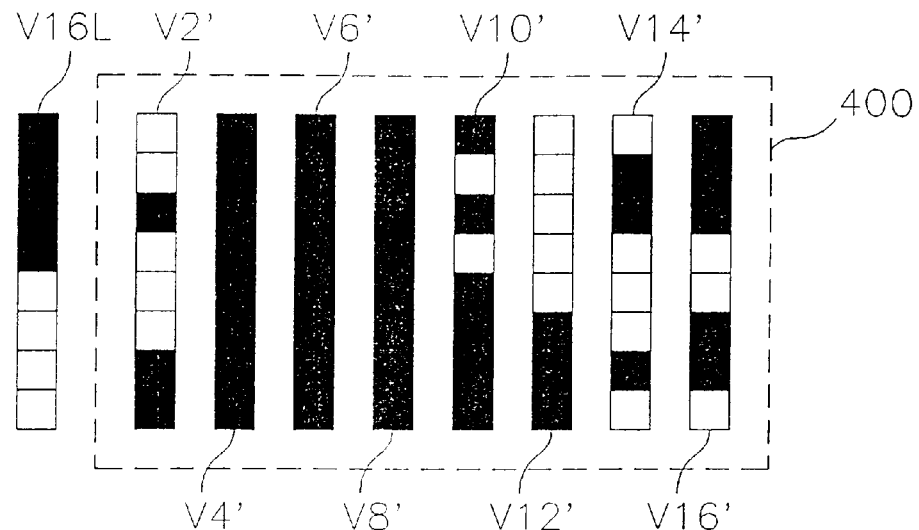
FIGS. 5A to 5F represent an interpolation process in accordance with a second embodiment of the present invention.
Figure 5B:
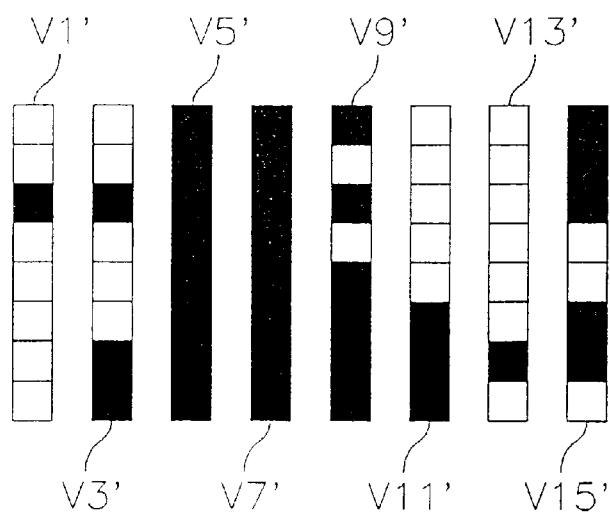
Figure 5C:
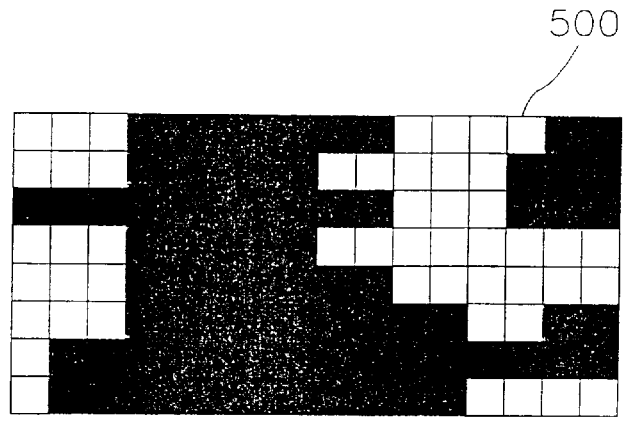

In the same manner in the interpolation process of the former embodiment, the sample block 150 in FIG. 2B is first divided into 8 number of vertical reference lines defined by indices V2', V4', . . . , V16' as shown in FIG. 5A to thereby provide a set of vertical reference lines 400, wherein each of the vertical reference lines V2' to V16' is identical to the corresponding vertical reference line in the first embodiment. This embodiment generates vertical interpolation lines V1', V3', . . . , V15' based on the set of vertical reference lines 400 and a vertical reference line V16L belonging to the left neighboring sample block of the sample block 150. Consequently, the vertical reference lines V16L and V2 are used as vertical reference lines for producing the vertical interpolation line V1' according to the predetermined rules. The rest of vertical interpolation lines V3' to V15', are determined as shown in FIG. 5B by applying the same rules used in the first embodiment which is carried out by comparing the number of segments for each of the vertical reference lines with that for its neighboring vertical reference line. Then, the vertical reference lines V2' to V16' and the vertical interpolation lines V1' to V15' are alternately combined together by rearranging them in the increasing order of the index i of Vi's to thereby produce a vertical interpolation block 500 as shown in FIG. 5C.

Figure 5D:
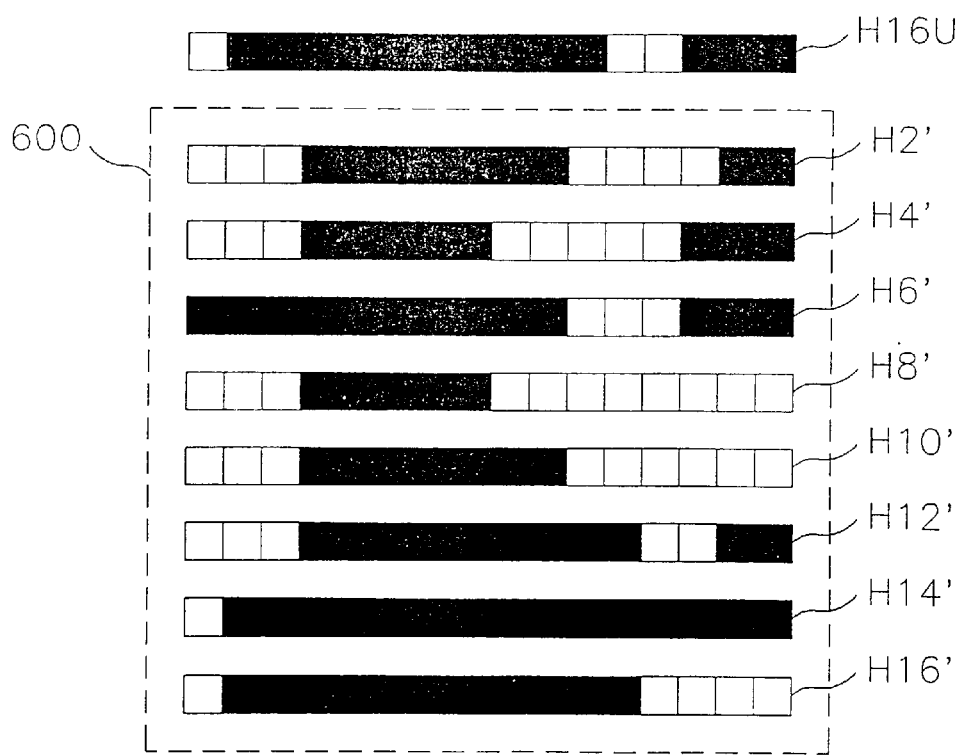
Figure 5E:
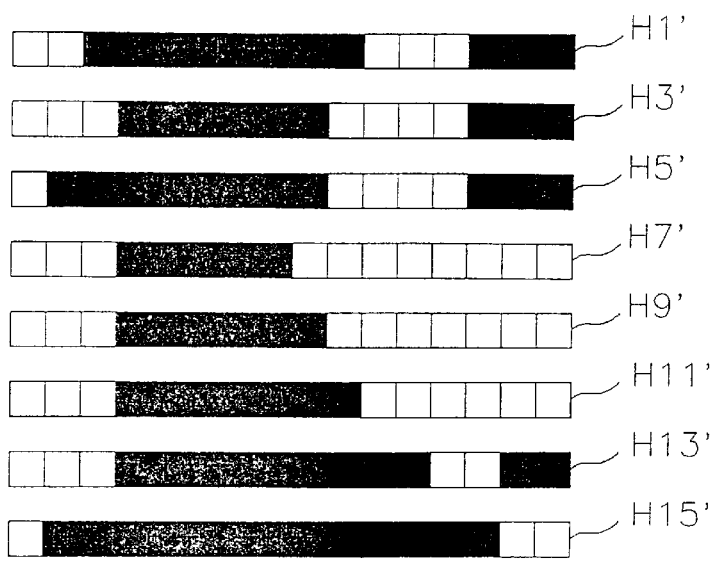

The vertical interpolation block 500 produced by the above vertical interpolation process is then horizontally divided into 8 number of horizontal reference lines which are represented by indices H2', H4', . . . , H16' as depicted in FIG. 5D and provided as a set of horizontal reference lines 600. In a similar manner to the vertical interpolation process, based on the set of horizontal reference lines 600 and a horizontal reference line H16U belonging to a vertical interpolation block corresponding to the upper neighboring sample block of the sample block 150, horizontal interpolation lines H1', H3', . . . , H15' are determined as shown in FIG. 5E. The newly obtained horizontal interpolation lines H1' to H15' are then combined with the set of horizontal reference lines H2' to H14' in the same manner used in the first embodiment so that an interpolation block 700 in FIG. 5F is produced.

Figure 4F:
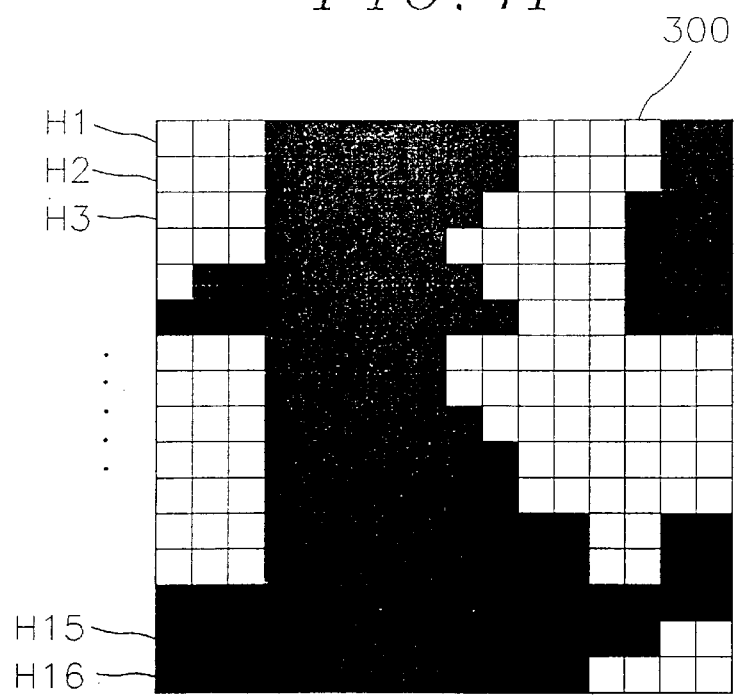
Figure 5F:
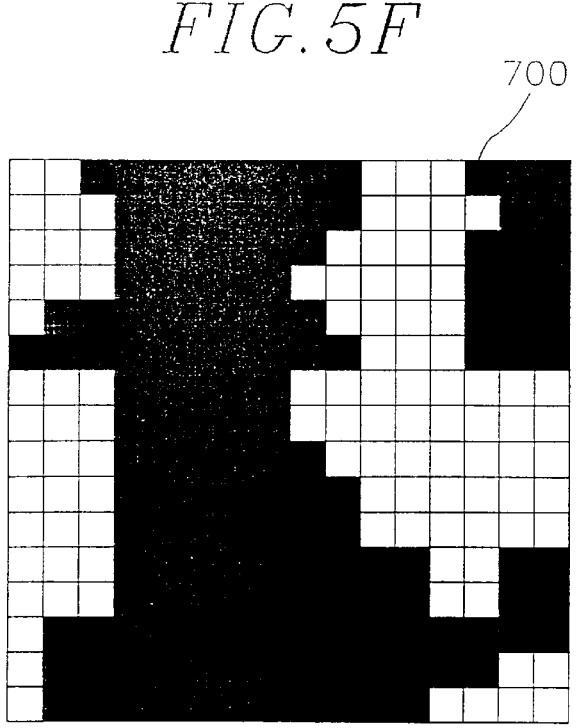

According to the two embodiments of the present invention, the sample block 150 can be extended to the interpolation blocks 300 and 700 which are a little bit different from each other as can be seen from FIGS. 4F and 5F.

The vertical and horizontal interpolation processes illustrated in the embodiments of the present invention can be performed together or independently, and also may be performed more than once depending on the sizes of the sample block and its original subblock.

While the present invention has been described with respect to certain preferred embodiments only, other modifications and variations may be made without departing from the spirit and scope of the present invention as set forth in the following claims.

What is claimed is:

1. A method for restoring a binary shape signal which has been downsized through the use of a sub-sampling or a down-sampling technique, the method comprising the steps of:

(a) receiving the downsized binary shape signal containing a plurality of reference lines, wherein each reference line includes one or more segments and non-segments, a segment being represented by one or more successive object pixels and a non-segment being defined by one or more successive background pixels;

(b) producing interpolation lines based on the number of segments on each of the reference lines, positions of the segments, and the number of object pixels included in each of the segments; and (c) providing the restored binary shape signal by combining the interpolation lines and the reference lines.

2. The method as recited in claim 1, wherein the reference lines are vertical reference lines.

3. The method as recited in claim 2, wherein the step (b) includes the steps of:

(b11) selecting two neighboring reference lines as target lines;

(b12) producing a vertical interpolation line based on the number of segments on each of the target lines, positions of the segments, and the number of object pixels contained in each of the segments;

(b13) repeating the steps (b11) and (b12) until all of the reference lines are processed; and (b14) supplying the vertical interpolation lines as the interpolation lines.

4. The method as recited in claim 3, wherein each of the vertical interpolation lines is determined as:

(p1) if the number of segments on each of the target lines is identical and there are overlapping segments on the target lines, said each of the vertical interpolation lines is generated to contain a segment determined based on positions of starting and ending points of the overlapping segments on the target lines, wherein the overlapping segments represent segments overlapped when the target lines are overlapped with each other;

(q1) if the number of segments on each of the target lines is identical and there exist non-overlapping segments on the target lines, said each of the vertical interpolation lines is produced to contain two segments generated by using the non-overlapping segments on the target lines, respectively, wherein the non-overlapping segments represent segments which do not overlap when the target lines are overlapped with each other; and (r1) if the number of segments on each of the target lines is different, said each of the vertical interpolation lines is determined by AND-operating on the segments on each of the target lines.

5. The method as recited in claim 3, wherein said step (b) further includes the steps of:

(b15) combining the vertical interpolation lines and the reference lines to thereby produce a vertical interpolated binary shape signal having a plurality of horizontal reference lines, wherein each horizontal reference line includes one or more segments and non-segments, a segment being represented by one or more successive object pixels and a non-segment being defined by one or more successive background pixels;

(b16) selecting two neighboring horizontal reference lines as the target lines;

(b17) producing a horizontal interpolation line based on the number of segments on each of the target lines, positions of the segments, and the number of object pixels contained in each of the segments;

(b18) repeating the steps (b16) and (b17) until all of the horizontal reference lines are processed; and (b19) supplying the horizontal interpolation lines as the interpolation lines and the horizontal reference lines as the reference lines.

6. The method as recited in claim 5, wherein each of the horizontal interpolation lines is determined as:

(p2) if the number of segments on each of the target lines is identical and there are overlapping segments on the target lines, said each of the horizontal interpolation lines is generated to contain a segment determined based on positions of starting and ending points of the overlapping segments on the target lines, wherein the overlapping segments represent segments overlapped when the target lines are overlapped with each other;

(q2) if the number of segments on each of the target lines is identical and there exist non-overlapping segments on the target lines, said each of the horizontal interpolation lines is produced to contain two segments generated by using the non-overlapping segments on the target lines, respectively, wherein the non-overlapping segments represent segments which do not overlap when the target lines are overlapped with each other; and (r2) if the number of segments on each of the target lines is different, said each of the horizontal interpolation lines is determined by AND-operating on the segments on each of the target lines.

7. The method as recited in claim 1, wherein the reference lines are horizontal reference lines.

8. The method as recited in claim 7, wherein the step (b) includes the steps of:

(b21) selecting two neighboring reference lines as target lines;

(b22) producing a horizontal interpolation line based on the number of segments on each of the target lines, positions of the segments, and the number of object pixels contained in each of the segments;

(b23) repeating the steps (b21) and (b22) until all of the reference lines are processed; and (b24) supplying the horizontal interpolation lines as the interpolation lines.

9. The method as recited in claim 8, wherein each of the horizontal interpolation lines is determined as:

(p3) if the number of segments on each of the target lines is identical and there are overlapping segments on the target lines, said each of the horizontal interpolation lines is generated to contain a segment determined based on positions of starting and ending points of the overlapping segments on the target lines, wherein the overlapping segments represent segments overlapped when the target lines are overlapped with each other;

(q3) if the number of segments on each of the target lines is identical and there exist non-overlapping segments on the two target lines, said each of the horizontal interpolation lines is produced to contain two segments generated by using the non-overlapping segments on the target lines, respectively, wherein the non-overlapping segments represent segments which do not overlap when the target lines are overlapped with each other; and (r3) if the number of segments on each of the target lines is different, said each of the horizontal interpolation lines is determined by AND-operating on the segments on each of the target lines.

10. The method as recited in claim 8, wherein said step (b) further includes the steps of:

(b25) combining the horizontal interpolation lines and the reference lines to thereby produce a horizontal interpolated binary shape signal having a plurality of vertical reference lines, wherein each vertical reference line includes one or more segments and non-segments, a segment being represented by one or more successive object pixels and a non-segment being defined by one or more successive background pixels;

(b26) selecting two neighboring vertical reference lines as the target lines;

(b27) producing a vertical interpolation line based on the number of segments on each of the target lines, positions of the segments, and the number of object pixels contained in each of the segments;

(b28) repeating the steps (b26) and (b27) until all of the vertical reference lines are processed; and (b29) supplying the vertical interpolation lines as the interpolation lines and the vertical reference lines as the reference lines.

11. The method as recited in claim 10, wherein each of the vertical interpolation lines is determined as:

(p4) if the number of segments on each of the target lines is identical and there are overlapping segments on the target lines, said each of the vertical interpolation lines is generated to contain a segment determined based on positions of starting and ending points of the overlapping segments on the target lines, wherein the overlapping segments represent segments overlapped when the target lines are overlapped with each other;

(q4) if the number of segments on each of the target lines is identical and there exist non-overlapping segments on the two target lines, said each of the vertical interpolation lines is produced to contain two segments generated by using the non-overlapping segments on the target lines, respectively, wherein the non-overlapping segments represent segments which do not overlap when the target lines are overlapped with each other; and (r4) if the number of segments on each of the target lines is different, said each of the vertical interpolation lines is determined by AND-operating on the segments on each of the target lines.

12. A method for producing an interpolation line based on two reference lines, wherein the interpolation line is to be inserted between the two reference lines, comprising the steps of:

(a) detecting the number of segments on each of the two reference lines, positions of the segments, and the number of object pixels on each of the segments, wherein each of the reference lines includes one or more segments, a segment being represented by one or more successive object pixels; and (b) if the number of segments on said each of the two reference lines is identical and there are overlapping segments on the two reference lines, producing the interpolation line which contains a segment determined based on positions of starting and ending points of the overlapping segments on each of the two reference lines, wherein the overlapping segments represent segments overlapped when the two reference lines are overlapped with each other.

13. The method as recited in claim 12, wherein the overlap of the two reference lines is accomplished by comparing object pixel positions contained in the segments on the two reference lines.

14. The method as recited in claim 12 further comprising the step of, if the number of segments on each of the two reference lines is identical and there exist non-overlapping segments on the two reference lines, producing the interpolation line which contains two segments generated by using the non-overlapping segments on the two reference lines, respectively, wherein the non-overlapping segments represent segments which do not overlap when the two reference lines are overlapped with each other.

15. The method as recited in claim 14, wherein, if the non-overlapping segment on each of the two reference lines contains a pixel located on a first or a last pixel position of the reference line, the corresponding segment on the interpolation line is produced through the use of the number of object pixels contained in said non-overlapping segment on the reference line.

16. The method as recited in claim 14, wherein, if the non-overlapping segment on each of the two reference lines includes neither the first nor the last pixel position of the reference line, the corresponding segment on the interpolation line is generated by using a starting and an ending points of said non-overlapping segment on the reference line.

17. The method as recited in claim 16, wherein a starting and an ending points of the segment on the interpolation line are calculated as:

$$SP \approx (3 \times P + 1 \times Q)/4$$

$$EP \approx (1 \times P + 3 \times Q)/4$$

wherein SP and EP represent the starting and the ending points of the segment on the interpolation line, respectively; and P and Q are a starting and an ending points of the non-overlapping segment on the reference line, respectively.

18. The method as recited in claim 17, wherein, if the value SP or EP is not an integer, the starting or the ending point is obtained by truncating the calculated value.

19. The method as recited in claim 14 further comprising the step of, if the number of segments on each of the two reference lines is different, generating the interpolation line by AND-operating on the segments on each of the two reference lines.

20. The method as recited in claim 12, wherein, if there exists only one reference line, the interpolation line is identical to the reference line.

* * * * *